(12) United States Patent
Kimmel et al.

(10) Patent No.: US 11,861,444 B1
(45) Date of Patent: Jan. 2, 2024

(54) AUTOMATED INVENTORY TRACKING SYSTEM AND METHOD

(71) Applicant: Scaled Solutions Technologies LLC, San Diego, CA (US)

(72) Inventors: Kyle Kimmel, San Diego, CA (US); Thomas Lugo, San Diego, CA (US); Jeffrey Anson, San Diego, CA (US); Luis Ramirez Briceno, San Diego, CA (US); Elijah Taylor-Kuni, Stockton, CA (US)

(73) Assignee: Scaled Solutions Technologies LLC, San Diego, CA (US)

( * ) Notice: Subject to any disclaimer, the term of this patent is extended or adjusted under 35 U.S.C. 154(b) by 0 days.

(21) Appl. No.: 18/221,292

(22) Filed: Jul. 12, 2023

(51) Int. Cl.
*G06K 7/10* (2006.01)

(52) U.S. Cl.
CPC .............................. *G06K 7/10099* (2013.01)

(58) Field of Classification Search
None
See application file for complete search history.

(56) References Cited

U.S. PATENT DOCUMENTS

| | | | | |
|---|---|---|---|---|
| 6,707,381 B1* | 3/2004 | Maloney | ................. | G07F 9/026 340/568.1 |
| 2007/0215700 A1* | 9/2007 | Reznik | ................... | G06Q 10/08 235/385 |
| 2008/0157967 A1* | 7/2008 | Jones | ..................... | G01G 19/42 340/572.1 |
| 2013/0181615 A1* | 7/2013 | Lee | ........................ | H10K 59/50 257/E33.072 |
| 2013/0281279 A1* | 10/2013 | Yagi | ......................... | B04B 9/14 494/42 |
| 2015/0339622 A1* | 11/2015 | MacDonald | ....... | G06K 7/10415 705/2 |
| 2016/0217272 A1* | 7/2016 | Panzini | ................. | G16H 40/67 |

\* cited by examiner

*Primary Examiner* — John F Mortell
(74) *Attorney, Agent, or Firm* — Fresh IP PLC; John R. Bednarz; Emily Do

(57) ABSTRACT

A system includes a bin detector comprising an antenna, a bin configured to accommodate at least one item and having a bin unique identifier, at least one processor to receive a weight of the at least one item from at least one sensor in communication with a scale, and at least one battery to power the system, the bin detector to transmit a first signal, receive a second signal in response to the first signal for each of the at least one item and determine an item unique identifier for each of the at least one item, and transmit the bin unique identifier, the item unique identifier for each of the at least one item, and the weight information to the processor to transmit the bin unique identifier, the item unique identifier for each of the at least one item, and the weight information to a server computing device.

20 Claims, 10 Drawing Sheets

AUTOMATED INVENTORY TRACKING SYSTEM AND METHOD

BACKGROUND

Currently, laboratories rely heavily on manual systems, which lead to increased financial and time costs. These outdated methods hinder scientific tasks and productivity, highlighting the urgent need for a reliable and efficient inventory tracking system.

There is a significant gap in existing laboratory inventory management systems, specifically in reagent tracking. Laboratories in the United States and worldwide face the challenge of managing a very large number of reagents efficiently. The reliance on manual inventory management systems, such as paper-based records or basic electronic spreadsheets, has proven to be inadequate. These conventional approaches are prone to errors, delays, and inconsistencies, resulting in inefficiencies, wasted resources, and potential scientific setbacks. The deficiencies identified in the conventional systems include use of manual tasks that interfere with scientific tasks, leading to lost time and productivity.

It is with these issues in mind, among others, that various aspects of the disclosure were conceived.

SUMMARY

The present disclosure is directed to an automated inventory tracking system and method. A system may include a number of bins. Each of the one or more bins may have a tag that has a unique identifier to identify the bin. The bin may be identified by a detector such as a detector located in a cabinet, refrigerator, or other location to store the bin. In addition, each of the one or more bins may have one or more items in the bin. Each of the one or more items may have a tag with a unique identifier to identify the item. The bin may have a detector or reader to determine the one or more items in the bin at a time. As an example, the bin may send a first signal at high frequency or ultra-high frequency and receive a response from high frequency or ultra-high frequency tags on items in the bin. In addition, the bin may have one or more sensors that may be connected to a scale to determine a weight of the bin at the time. When an item is removed from the bin, the bin may determine a weight. When the item is returned to the bin, the bin may determine a new weight. Based on a difference in weight of the bin, the bin may determine a change in weight of the item. The system may send one or more alerts to a user based on the change in weight of the item such as an alert to order a new quantity of the item. The system may also send an alert to a bin to signal via message, audio, or light display.

In one example, a system may include a bin detector comprising an antenna, a bin configured to accommodate at least one item and having a bin unique identifier, at least one processor to receive a weight of the at least one item from at least one sensor in communication with a scale, and at least one battery to power the system, the bin detector to transmit a first signal, receive a second signal in response to the first signal for each of the at least one item and determine an item unique identifier for each of the at least one item, and transmit the bin unique identifier, the item unique identifier for each of the at least one item, and the weight information to the at least one processor to transmit the bin unique identifier, the item unique identifier for each of the at least one item, and the weight information to a server computing device using a communication network.

In another example, a method may include receiving and transmitting, by at least one processor, to a server computing device, weight information at a first time from at least one sensor device, the weight information comprising weight information for at least one item in a bin, receiving, by a bin detector, a first request to access the bin, the first request comprising an item removal having a first event comprising an item identifier, a user identifier, a bin identifier, and the weight information at the first time, associating, by the at least one processor, the first weight and the item identifier into a first information payload and transmitting, by the bin detector, of the first information payload to the server computing device, the server computing device further associating concurrent user information from a storage area detector and updating a status for an item as checked out by a detected user having the user identifier, receiving, by the bin detector, a second request to access the bin, the second request comprising an item return having a second event comprising the item identifier, the user identifier, and the bin identifier, receiving, by the at least one processor, the weight information a second time from the at least one sensor device, the weight information comprising the weight information for the at least one item in the bin, associating, by the at least one processor, the second weight and the item identifier into a second information payload and transmitting, by the bin detector, the second information payload to the server computing device, the server computing device further associating concurrent user information from the storage area detector, determining, by the server computing device, a difference in the weight information at the first time and the weight information at the second time, and determining, by the server computing device, weight information for an item having the item identifier based on the difference in the weight information at the first time and the weight information at the second time and storing updated weight information in a database and updating a status, amount, and bin location of the item in an automated inventory application.

In another example, a storage container may include a first removable component comprising: a bin configured to accommodate at least one item and having a bin unique identifier, and electromagnetic field (EMF) shielding to prevent electromagnetic noise, and a second component housed underneath the first removable component comprising: a bin detector comprising an antenna, at least one processor to receive a weight of the at least one item from at least one sensor in communication with a scale, and at least one battery to power the storage container, the bin detector to transmit a first signal, receive a second signal in response to the first signal for each of the at least one item and determine an item unique identifier for each of the at least one item, and transmit the bin unique identifier, the item unique identifier for each of the at least one item, and the weight information to the at least one processor to transmit the bin unique identifier, the item unique identifier for each of the at least one item, and the weight information to a server computing device using a communication network.

These and other aspects, features, and benefits of the present disclosure will become apparent from the following detailed written description of the preferred embodiments and aspects taken in conjunction with the following drawings, although variations and modifications thereto may be effected without departing from the spirit and scope of the novel concepts of the disclosure.

BRIEF DESCRIPTION OF THE DRAWINGS

The accompanying drawings illustrate embodiments and/or aspects of the disclosure and, together with the written description, serve to explain the principles of the disclosure. Wherever possible, the same reference numbers are used throughout the drawings to refer to the same or like elements of an embodiment, and wherein.

DETAILED DESCRIPTION

Figure 1:
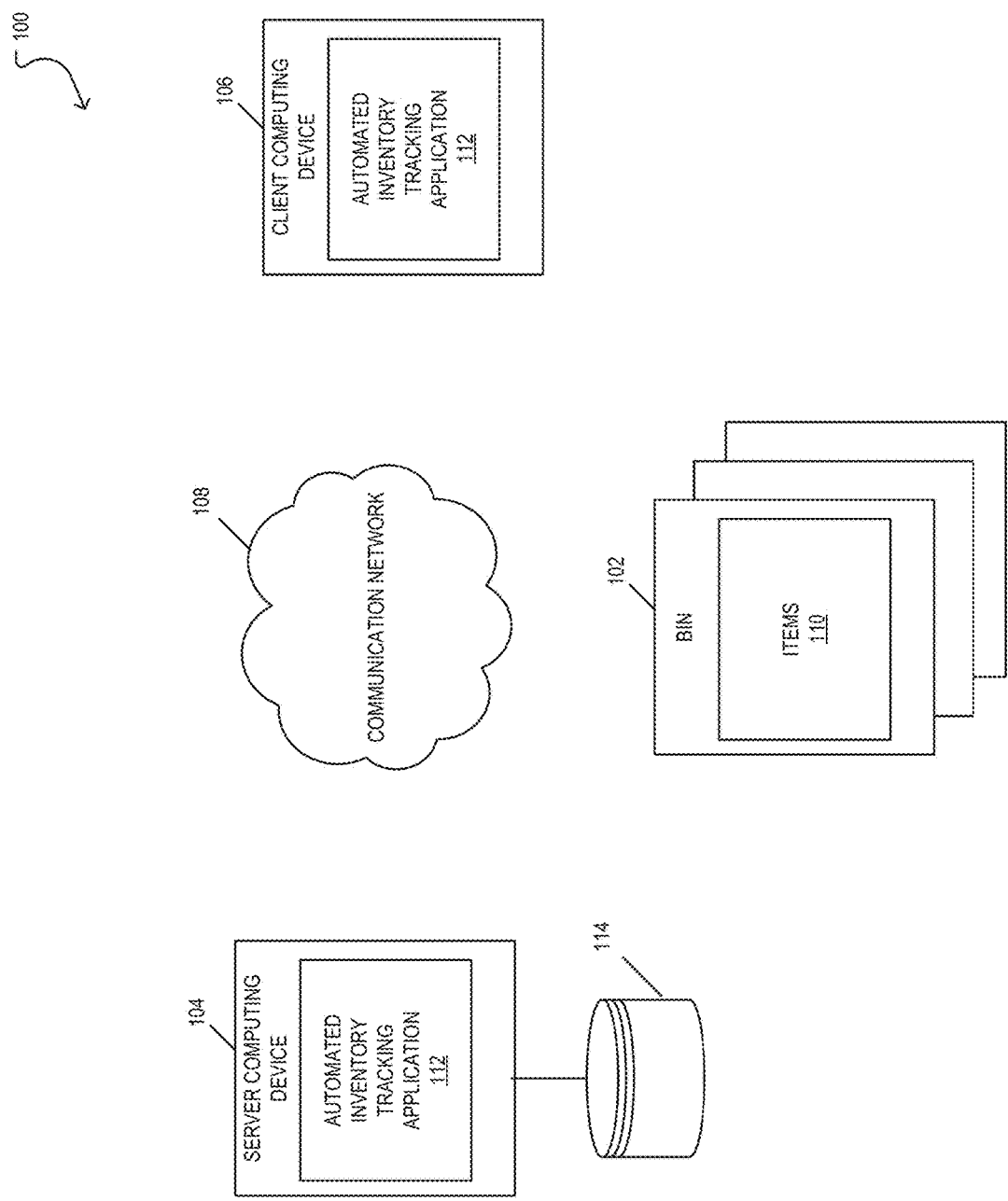
FIG. 1 is a block diagram of an automated inventory tracking system according to an example of the instant disclosure.

The present invention is more fully described below with reference to the accompanying figures. The following description is exemplary in that several embodiments are described (e.g., by use of the terms "preferably," "for example," or "in one embodiment"); however, such should not be viewed as limiting or as setting forth the only embodiments of the present invention, as the invention encompasses other embodiments not specifically recited in this description, including alternatives, modifications, and equivalents within the spirit and scope of the invention. Further, the use of the terms "invention," "present invention," "embodiment," and similar terms throughout the description are used broadly and not intended to mean that the invention requires, or is limited to, any particular aspect being described or that such description is the only manner in which the invention may be made or used. Additionally, the invention may be described in the context of specific applications; however, the invention may be used in a variety of applications not specifically described.

The embodiment(s) described, and references in the specification to "one embodiment", "an embodiment", "an example embodiment", etc., indicate that the embodiment(s) described may include a particular feature, structure, or characteristic. Such phrases are not necessarily referring to the same embodiment. When a particular feature, structure, or characteristic is described in connection with an embodiment, persons skilled in the art may effect such feature, structure, or characteristic in connection with other embodiments whether or not explicitly described.

In the several figures, like reference numerals may be used for like elements having like functions even in different drawings. The embodiments described, and their detailed construction and elements, are merely provided to assist in a comprehensive understanding of the invention. Thus, it is apparent that the present invention can be carried out in a variety of ways, and does not require any of the specific features described herein. Also, well-known functions or constructions are not described in detail since they would obscure the invention with unnecessary detail. Any signal arrows in the drawings/figures should be considered only as exemplary, and not limiting, unless otherwise specifically noted. Further, the description is not to be taken in a limiting sense, but is made merely for the purpose of illustrating the general principles of the invention, since the scope of the invention is best defined by the appended claims.

It will be understood that, although the terms "first," "second," etc. may be used herein to describe various elements, these elements should not be limited by these terms. These terms are only used to distinguish one element from another. Purely as a non-limiting example, a first element could be termed a second element, and, similarly, a second element could be termed a first element, without departing from the scope of example embodiments. As used herein, the term "and/or" includes any and all combinations of one or more of the associated listed items. As used herein, the singular forms "a", "an," and "the" are intended to include the plural forms as well, unless the context clearly indicates otherwise. It should also be noted that, in some alternative implementations, the functions and/or acts noted may occur out of the order as represented in at least one of the several figures. Purely as a non-limiting example, two figures shown in succession may in fact be executed substantially concurrently or may sometimes be executed in the reverse order, depending upon the functionality and/or acts described or depicted.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Aspects of a system and method for automated inventory tracking includes one or more bins. Each of the one or more bins may have a tag that has a unique identifier to identify the bin. The bin may be identified by a detector that may be located in a cabinet, refrigerator, or other location to store the bin. In addition, each of the one or more bins may have one or more items in the bin. Each of the one or more items may have a tag with a unique identifier to identify the item. Each tag may be an RFID tag, which may be an ultra-high frequency (UHF) tag, NFC tag, or dual UHF/NFC tag. The bin may have a detector or reader to determine the one or more items in the bin at a time. As an example, the bin may send a first signal at high frequency or ultra-high frequency and receive a response from high frequency or ultra-high frequency tags on items in the bin. In addition, the bin may have one or more sensors that may be connected to a scale to determine a weight of the scale at the time. When an item is removed from the bin, the system may determine a removal of the item and the bin weight after removal. When the item is returned to the bin, the system may read the return of the item and determine a new weight. Based on a difference in bin weight, the bin may determine a change in weight of the item. The system may send one or more alerts based on the change in weight of the item such as an alert to order a new quantity of the item. The system may also send one or more alerts to a bin location where the item is returned such as an alert indicating the item is returned to the incorrect bin.

As an example, a system may include a bin detector comprising an antenna, a bin configured to accommodate at least one item and having a bin unique identifier, at least one processor to receive a weight of the at least one item from at least one sensor in communication with a scale, and at least one battery to power the system, the bin detector to transmit a first signal, receive a second signal in response to the first signal for each of the at least one item and determine an item unique identifier for each of the at least one item, and transmit the bin unique identifier, the item unique identifier for each of the at least one item, and the weight information to the processor to transmit the bin unique identifier, the item unique identifier for each of the at least one item, and the weight information to a server computing device using a communication network. The communications network may be a wireless network including a Bluetooth network or a LoRaWAN network, among others.

There is a significant gap in existing laboratory inventory management systems, specifically in reagent tracking. Laboratories in the United States and worldwide face the challenge of managing a very large number, e.g., thousands or even more, of reagents efficiently. The reliance on manual inventory management systems, such as paper-based records or basic electronic spreadsheets, has proven to be inadequate. These conventional approaches are prone to errors, delays, and inconsistencies, resulting in inefficiencies, wasted resources, and potential scientific setbacks. The deficiencies identified in the conventional systems include use of manual tasks that interfere with scientific tasks, leading to lost time and productivity. As an example, there may be approximately 100,000 laboratories in the United States that may make use of the automated inventory tracking system. These laboratories may eliminate duplicate orders, have enhanced inventory management, time savings, and waste reduction.

The automated inventory tracking system is a comprehensive system that eliminates the need for manual input from laboratory staff. The automated inventory tracking system is a modular system that provides advanced functionality, allowing the system to be adaptable to laboratories of varying sizes and needs. The system may utilize radio-frequency identification (RFID), smart devices, RFID detectors, and smart bins to accurately track reagent levels, locations, and current users.

In one example, the automated inventory tracking system may use communication by radio frequency signaling including electromagnetic waves in the radio frequency range (20 KHz to 300 GHz). The automated inventory tracking system may use multiple distinct and non-interfering types of telecommunications based on operating frequency ranges (bands), including cellular, WiFi, Bluetooth, UHF RFID and HF RFID, among others. NFC is an example of HF technology in use. As is known, HF (NFC) is 13.56 MHz and UHF ranges from 300-3000 MHz. NFC read distance can be centimeters whereas UHF can read over a meter away. In one example, the automated inventory tracking system may have cabinet detectors that are UHF and read bins and user badges that have UHF or dual tags. The bin detector may use NFC with NFC-tagged consumables. Alternatively the bin may be outfitted with a UHF detector and use electromagnetic shielding around the bin perimeter to preclude detection of items in adjacent bins or bin tags. As an example, NFC detection of bin items can be used if there is a sufficiently strong and resolved antenna signal to continuously read all items within a bin without data collision.

In one example, an embedded antenna in a bin can broadcast a call signal at HF or UHF frequency and read response signals from passive HF or UHF RFID tags on items within the bin. The antenna receiver may receive the signal from the embedded antenna and pass the signal along to the antenna transmitter that transmits the signal to a processor. The processor may associate the RFID information with weight information received and transmit the information payload via a communication network to a server computing device such as a cloud server. In the case of removal or return of an item from a bin, a detector assigned to a cabinet in which that bin resides may also capture and associate user and bin information into a payload and similarly transmit that information payload via a communication network to a server computing device such as a cloud server. The cloud server may use associated payload information such as these to determine updated net weight and update the status of items, bins, and users. As an example, this may include associating bin processor and cabinet processor payloads at an event in time and updating the software application with information depicting that, for example, User A returned Item 1 to Bin B at Time T with updated net weight W.

As an example, a cabinet detector may detect one or more bins and one or more users that are accessing the one or more bins. A bin detector may detect one or more items in a bin. Each of the cabinet detector and the bin detector may send information associated with the one or more bins and the one or more users to a computing device such as a server computing device. Based on the information from the cabinet detector and the bin detector, the server computing device may determine realtime information associated with the bins. For example, a particular user may have accessed a bin at 2:00 p.m. and a particular item may have been removed from the bin from 2:00 p.m. to 3:00 p.m. When the particular item is returned to the bin at 3:00 p.m., the item may have a weight that is less than when the item was removed. As a result, the server computing device may determine that the particular user used a particular amount of the item from 2:00 p.m. to 3:00 p.m.

In one example, the amount of the item may be determined based on a weight of the item in conjunction with one or more images that may be captured of the item. There may be one or more images that may be captured when the item is initially added into the system. The system may perform image processing of at least one image of the item to determine the approximate level of solid, liquid, or semi-solid substance remaining within the container and compute the estimated substance weight by applying the estimated percentage full, from image processing to the initial purchase quantity from the container label. Subsequently, the amount of the item in the container may be determined by determining the difference in the weight information for the bin at a first time and the weight information for the bin at a second time. In one example, when the item having the item identifier with the initial amount estimated from image processing is placed in a bin having a sensor connected with a scale, a bin weight immediately prior to and after placing the item in the bin may be transmitted to a cloud server computing device. The server computing device may then determine and store the item container tare weight by taking the difference between the bin weight change and the initial substance amount estimated from image processing.

The automated inventory tracking system may utilize an automated inventory tracking application that may provide a cloud-based portal and a client application that may include a mobile scanning/tracking application component. The system may interface with an inventory management portal or existing inventory management software through one or more application programming interfaces (APIs) to provide a holistic solution. Laboratory staff may have access to real-time inventory data, allowing the staff to track reagents, receive alerts for low stock or expired items, and efficiently manage procurement and reordering processes.

In one example, the automated inventory tracking system may have one or more bins to store and track one or more objects such as containers. In addition, the automated inventory tracking system may include one or more client computing devices that may communicate with one or more server computing devices. Additionally, the one or more client computing devices and the one or more server computing devices may communicate with the one or more bins.

The automated inventory tracking system may provide alerts for expiration dates, low levels, disposal, and automated reordering, among others. In addition, the automated inventory tracking application may allow for item registration, item differentiation, and provide scanning functionality using one or more imaging devices and visual intelligence. The automated inventory tracking application may provide chemical location lookup, safety data sheet (SDS) information, reassignment, and depletion tracking. The automated inventory tracking system may further provide alerts to one or more bins to correct placement of returned items. The automated inventory tracking application may further provide determination of remaining amounts, measure volume using weight information and known or calculated density, and ensure safety and compliance. The density may be calculated and reported using one or more algorithms.

In one example, the automated inventory tracking system may be located in a laboratory, pharmacy, manufacturing facility, restaurant, salon, secured rooms or facility (i.e., evidence room) or retail establishment. The laboratory, pharmacy, manufacturing facility, restaurant, salon, secured room or facility, or retail establishment may have one or more cabinets, refrigerators, freezers, shelves, and workspaces that can be outfitted with a smart device connected to one or more storage bins that can be assigned to one or more users or locations. Each smart device or bin can be connected to a network such as a wireless network or connected to other smart devices using a mesh network such as a LoRaWAN network. RFID UHF detectors may be located in cabinets or other storage locations. In one example, the RFID UHF detector may be located on an inner front of a cabinet and linked with a smart device and connected to the network. The RFID UHF detector may be connected with a Bluetooth network or a Wi-Fi network, among others. Alternatively, the RFID UHF detector could be connected and communicate with a smart device through ethernet, RS-232, or otherwise a hard-wired connection. The detector may detect the presence of smart bins, tagged items, and user badges.

For controlled substances, a cabinet can be outfitted with a door-open sensor and user badge detection to provide an automatic locking and unlocking mechanism. When a user badge is detected, the user badge can be associated with an item (e.g., bin or consumable) removal or return event. User badges may also grant access and log retrieval and return of controlled or secured items.

Smart storage bins may be placed in storage areas such as glass-pane or other cabinets, refrigerators, freezers, glove boxes, humidity chambers, flammable cabinets, storeroom shelves, workstations, secured rooms, and facilities, and other locations. The smart storage bins may be used to store grouped and compatible inventory items. Smart storage bins may be tagged with dual (e.g., UHF and NFC) RFID tags and may be detected in storage areas. Larger items can be stored outside bins and directly detected in storage areas. Items within smart bins may be tagged and detected when in the bin by a built-in detector. The bin detector can be linked (wired or wireless) with a circuit board that can be built into or associated with the bin. The bin can have modulated detector strength based on bin size and shape or can be accomplished by lining inner bin walls with a metallic coating or another type of coating to block signal transmission. In addition, a bin may have an affixed panel style scale that may be on the bottom of the bin that can be linked (wired or wirelessly) with the circuit board or computing device built into the bin. The bin may detect changes in weight upon removal of tagged items, associate weight change with an item upon return to the bin, and determine an amount used based on a difference and update an item net weight in real-time using the automated inventory tracking application. Items that are removed from a storage location may be visible in the automated inventory tracking application as "checked out." Items can be linked with information from a purchase order or safety data sheet (SDS) information. Items also can be associated with advisable storage conditions and other pertinent information such as reactivity, flammability, acid or base information, health or handling hazards, and expiration date information. The automated inventory tracking application may automatically recognize and extract relevant information from a purchase order and an SDS. In addition, the automated inventory tracking application can recognize and alert a user to incompatible storage, usage history, quality control, or an incorrect storage location via visual or audio alerts from individual bins. Users can utilize the automated inventory tracking application to determine real-time batch, amount, location, user, and quality information. In addition, the application may allow users including managers to save time and avoid disruptions.

The automated inventory system can also benefit lab hygiene and safety by monitoring the weight of items in storage and providing alerts for items which may require attention from lab personnel. For example, if a bin weight is increasing without any user activity, it may indicate the one or more chemical inventory items are hygroscopic and absorbing moisture from the air, indicating a potential quality issue. Conversely, if a bin weight is decreasing in the absence of user activity it may indicate one or more chemical inventory items are evaporating, which indicates a quality event and may pose a safety hazard for exposure to potentially toxic vapors. The automated inventory system can detect these events through incremental increases or decreases in weight. Upon receiving weight change information from one or more bin processors, the cloud server software may recognize an indicated quality event and alert users through either software alerts, smart device visual or audio user interface alerts, or a combination of the two.

When first using the automated inventory tracking application, a user may set up an account to allow the user to have access to the system and set preference information. In addition, the user can integrate the system with existing and other software such as inventory software, procurement software, and electronic laboratory notebook (ELN) software. The user may outfit a storage area with one or more smart devices and detectors and may tag and group items. The user may install a client application associated with the automated inventory tracking application on a mobile computing device such as a smartphone or a tablet computing device that may have NFC devices and imaging devices. Each consumable may be tagged with one or more NFC or UHF RFID tags. In addition, each bin can have its own tag.

The user may use their client computing device to scan a bin tag and select one or more consumable/item to be added to the bin. The user may scan a tag on the consumable/item and may also obtain one or more images or photographs of the consumable/item. The automated inventory tracking application may determine label information based on the one or more images and may extract item information. The automated inventory tracking application may determine whether there are associated orders, inventory, or notebook information that may be related to the item information extracted from the one or more images.

If there is an existing procured item, the automated inventory tracking application may determine a tare weight or may attempt to estimate content level (e.g., percentage) from the images. If the automated inventory tracking application is unable to determine a tare weight or attempt to estimate a content level, the user may enter information. The consumable/item may be placed in a bin. The bin may determine an item identifier and may determine the weight of the consumable/item. A net weight may be determined and stored. As a result, the system is able to provide real-time automated monitoring and management of inventory including for inventory items that are already in use and are not previously tracked.

A user can reassign a consumable from one bin to another bin. As an example, the user may use the automated inventory tracking application to scan an existing item or bin tag and may select an option to reassign a tag from one bin to another bin. The item may then be reassigned from one bin to another bin.

If an item or consumable is depleted, a user can use the automated inventory tracking application to scan an item and the associated item and bin may be recognized. The user may select a "Deplete" option. The automated inventory tracking application may prompt the user to empty, rinse, and place a container on the scale for tare. The container may be weighed, and a tare weight may be stored and/or retrieved for future orders. The automated inventory tracking system may use machine learning to compare the weight with an estimated tare and improve image processing amount estimation. The user may indicate that the item or consumable is depleted and the item may be confirmed as depleted.

The system may monitor a supply of contained goods and substances as they are used and depleted from containers. Additionally, the system may reduce waste by tracking an amount of material or product stored in opened containers. As the material is depleted and used, the system may determine how long containers have been stocked. In one example, the system can direct a user to use a partially used container that may be located in a particular bin in a laboratory rather than a new container in the laboratory.

FIG. 1 is a block diagram of an automated inventory tracking system 100 according to an example of the instant disclosure. As shown in FIG. 1, the system 100 may include one or more smart bins 102. Each bin 102 may have one or more items or consumables 110 that may be stored or housed in the bin 102. The system 100 may further include at least one server computing device 104 and at least one client computing device 106. The at least one server computing device 104 may be in communication with at least one database 114.

The client computing device 106 and the server computing device 104 may have an automated inventory tracking application 112 that may be a component of an application and/or service executable by the at least one client computing device 106 and/or the server computing device 104. For example, the automated inventory tracking application 112 may be a single unit of deployable executable code or a plurality of units of deployable executable code. According to one aspect, the automated inventory tracking application 112 may include one component that may be a web application, a native application, and/or a mobile application (e.g., an app) downloaded from a digital distribution application platform that allows users to browse and download applications developed with mobile software development kits (SDKs) including the App Store and GOOGLE PLAY®, among others.

The automated inventory tracking system 100 also may include a relational database management system (RDBMS) or another type of database management system such as a NoSQL database system that stores and communicates data from at least one database 114. The data stored in the at least one database 114 may be associated with the one or more bins and the one or more consumables/items that may be stored in the one or more bins. As an example, each bin may be associated with one or more items or consumables that may be stored in the bin and the real-time information associated with each of the one or more items or consumables may be stored in the database.

The at least one client computing device 106 and the at least one server computing device 104 may be configured to receive data from and/or transmit data through a communication network 108. Although the client computing device 106 and the server computing device 104 are shown as a single computing device, it is contemplated each computing device may include multiple computing devices.

The communication network 108 can be the Internet, an intranet, or another wired or wireless communication network. For example, the communication network may include a Mobile Communications (GSM) network, a code division multiple access (CDMA) network, $3^{rd}$ Generation Partnership Project (GPP) network, an Internet Protocol (IP) network, a wireless application protocol (WAP) network, a WiFi network, a Bluetooth network, a near field communication (NFC) network, a LoRaWAN network, a satellite communications network, or an IEEE 802.11 standards network, as well as various communications thereof. Other conventional and/or later developed wired and wireless networks may also be used.

The client computing device 106 may include at least one processor to process data and memory to store data. The processor processes communications, builds communications, retrieves data from memory, and stores data to memory. The processor and the memory are hardware. The memory may include volatile and/or non-volatile memory, e.g., a computer-readable storage medium such as a cache, random access memory (RAM), read only memory (ROM), flash memory, or other memory to store data and/or computer-readable executable instructions. In addition, the client computing device 106 further includes at least one communications interface to transmit and receive communications, messages, and/or signals.

The client computing device 106 could be a programmable logic controller, a programmable controller, a laptop computer, a smartphone, a personal digital assistant, a tablet computer, a standard personal computer, or another processing device. The client computing device 106 may include a display, such as a computer monitor, for displaying data and/or graphical user interfaces. The client computing device 106 may also include a Global Positioning System (GPS) hardware device for determining a particular location, an input device, such as one or more cameras or imaging devices, a keyboard or a pointing device (e.g., a mouse, trackball, pen, or touch screen) to enter data into or interact with graphical and/or other types of user interfaces. In an exemplary embodiment, the display and the input device may be incorporated together as a touch screen of the smartphone or tablet computer.

The server computing device 104 may include at least one processor to process data and memory to store data. The processor processes communications, builds communications, retrieves data from memory, and stores data to memory. The processor and the memory are hardware. The memory may include volatile and/or non-volatile memory, e.g., a computer-readable storage medium such as a cache, random access memory (RAM), read only memory (ROM), flash memory, or other memory to store data and/or computer-readable executable instructions. In addition, the server computing device 104 further includes at least one communications interface to transmit and receive communications, messages, and/or signals.

Figure 2:
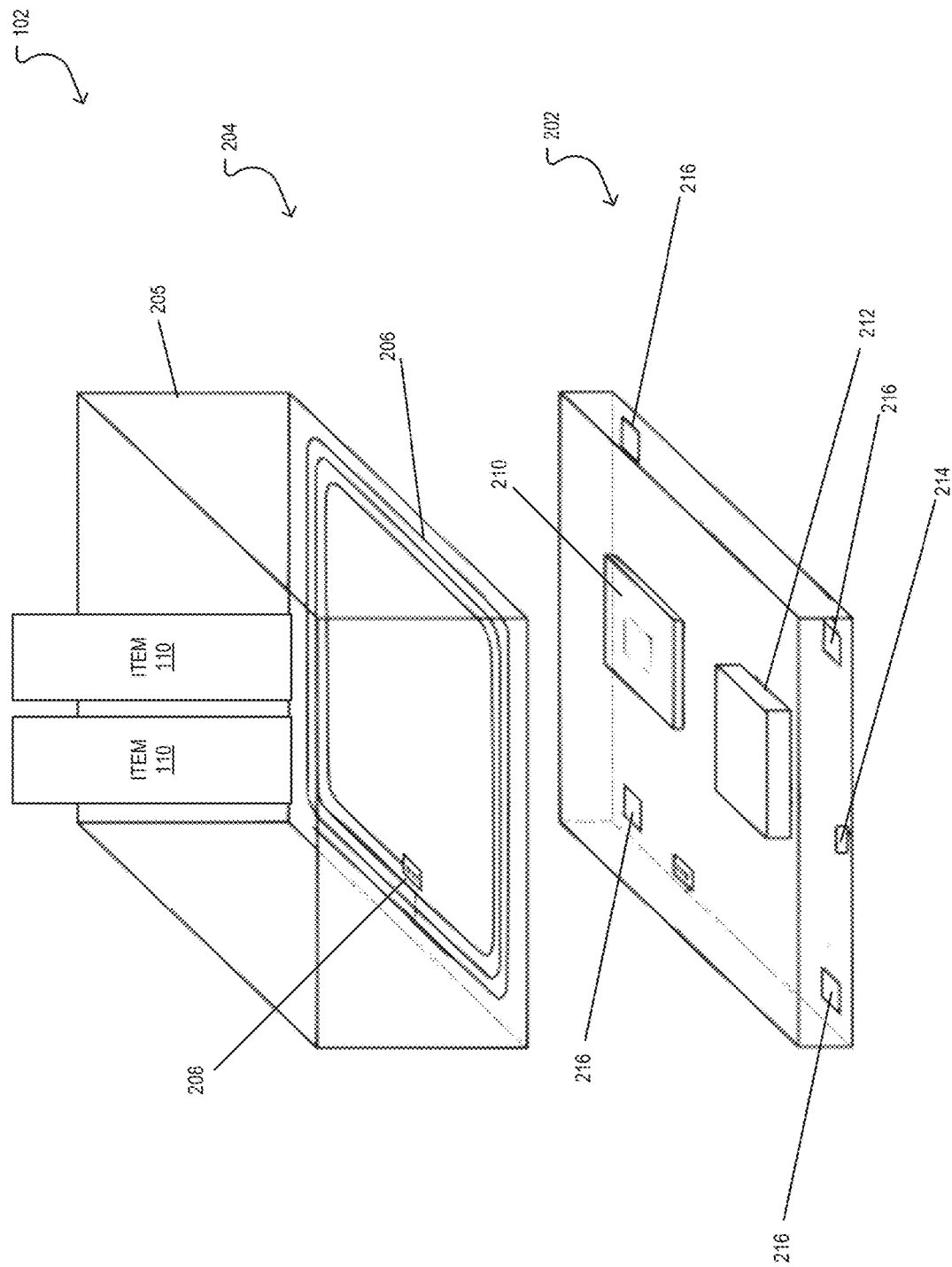
FIG. 2 is a diagram of a bin of the automated inventory tracking system according to an example of the instant disclosure.

FIG. 2 is a diagram of a bin 102 of the automated inventory tracking system 100 according to an example of the instant disclosure. In one example, each bin 102 may have a removable scale and a container that may be configured to accommodate NFC, RFID UHF, or UHF/NFC dual tag consumables/items that have a variety of different shapes, sizes, and materials.

In one example, the automated inventory tracking system 100 may have bins 102 that track items/consumables using RFID and may not include a scale component. In another example, the automated inventory tracking system 100 may have bins 102 that only have a scale component and do not track items/consumables using RFID. In another example, the automated inventory tracking system 100 may have bins 102 that track inventory quantity and location. Each bin may have an RFID detector component and a scale component. This configuration may allow a laboratory to track an amount of inventory items and monitor a specific location of an item within a laboratory.

In an example, the bin 102 may be a smart bin that may have a lower component or box that may have a printed circuit board with at least one processor, a microcontroller, or a computing device to receive information from four H-bridge sensors for weighing and one or more rechargeable batteries to power the printed circuit board or computing device as well as an HF or UHF RFID antenna transmitter connector to connect to a container that houses consumables/items. An upper component or detachable container may have an antenna receiver connector, an embedded HF or UHF RFID antenna, one or more display devices, and have walled electromagnetic field (EMF) shielding to prevent HF or UHF RFID noise from entering other bins 102.

In one example, the bin 102 may be part of a system and may have a bin detector including an antenna, and it may be configured to accommodate at least one item 110 and have a bin unique identifier. In addition, the bin 102 may have at least one processor to receive a weight of the at least one item 110 from at least one sensor in communication with a scale, and at least one battery to power the system.

The bin detector may transmit a first signal, receive a second signal in response to the first signal for each of the at least one item 110 and determine an item unique identifier for each of the at least one item, and transmit the bin unique identifier, the item unique identifier for each of the at least one item 110, and the weight information to the processor to transmit the bin unique identifier, the item unique identifier for each of the at least one item, and the weight information to the server computing device 104 using the communication network 108.

In another example, a storage container may have a first removable component including a bin 102 configured to accommodate at least one item 110 and have a bin unique identifier and electromagnetic field (EMF) shielding to prevent electromagnetic noise. The storage container may have a second component housed underneath the first removable component and may include a bin detector comprising an antenna, at least one processor to receive a weight of the at least one item 110 from at least one sensor in communication with a scale, and at least one battery to power the storage container.

The bin detector may transmit a first signal, receive a second signal in response to the first signal for each of the at least one item and determine an item unique identifier for each of the at least one item 110, and transmit the bin unique identifier, the item unique identifier for each of the at least one item, and the weight information to the processor to transmit the bin unique identifier, the item unique identifier for each of the at least one item, and the weight information to the server computing device 104 using the communication network 108.

As shown in FIG. 2, a bin 102 may have a number of components. Each bin 102 may be configured as a single-piece bin or may have multiple pieces that may be detached from one another such as a first piece or part to hold the items/consumables and a second piece or part to weigh the items/consumables 110. In addition, each bin may have a variety of different shapes and sizes. In one example, the bin 102 may include one or more base station scales 202. In addition, the bin 102 may have a container 204 to store one or more items/consumables 110. The bin 102 may have walled electromagnetic field (EMF) shielding 205 that may be associated with one or more walls of the container 204. There may be one or more cabinet RFID detectors that may be placed near one or more bins and that may be connected to the communication network 108. The cabinet detectors may detect the presence of tags associated with bins and tags associated with users. The bin 102 may further include an antenna receiver connector 206 and an antenna transmitter connector 208 that may together serve as a bin detector to detect one or more items in a bin based on tags on the one or more items. As an example, the antenna transmitter may send or broadcast a first signal at high frequency or ultra-high frequency and receive a response from high frequency or ultra-high frequency tags on items in the bin. The bin 102 may have one or more printed circuit boards 210 having one or more processors or one or more computing devices to communicate with the bin detector, the client computing device 106, and/or the server computing device 104. In one example, one or more bins 102 may communicate with a bin router and the bin router may communicate with the client computing device 106 and/or the server computing device 104. The bin 102 may have one or more batteries 212 that may be lithium ion batteries. The bin 102 may have a power source 214 that may be a universal serial bus (USB) power source. In addition, the bin 102 may have one or more scale H-bridges 216.

Figure 3:
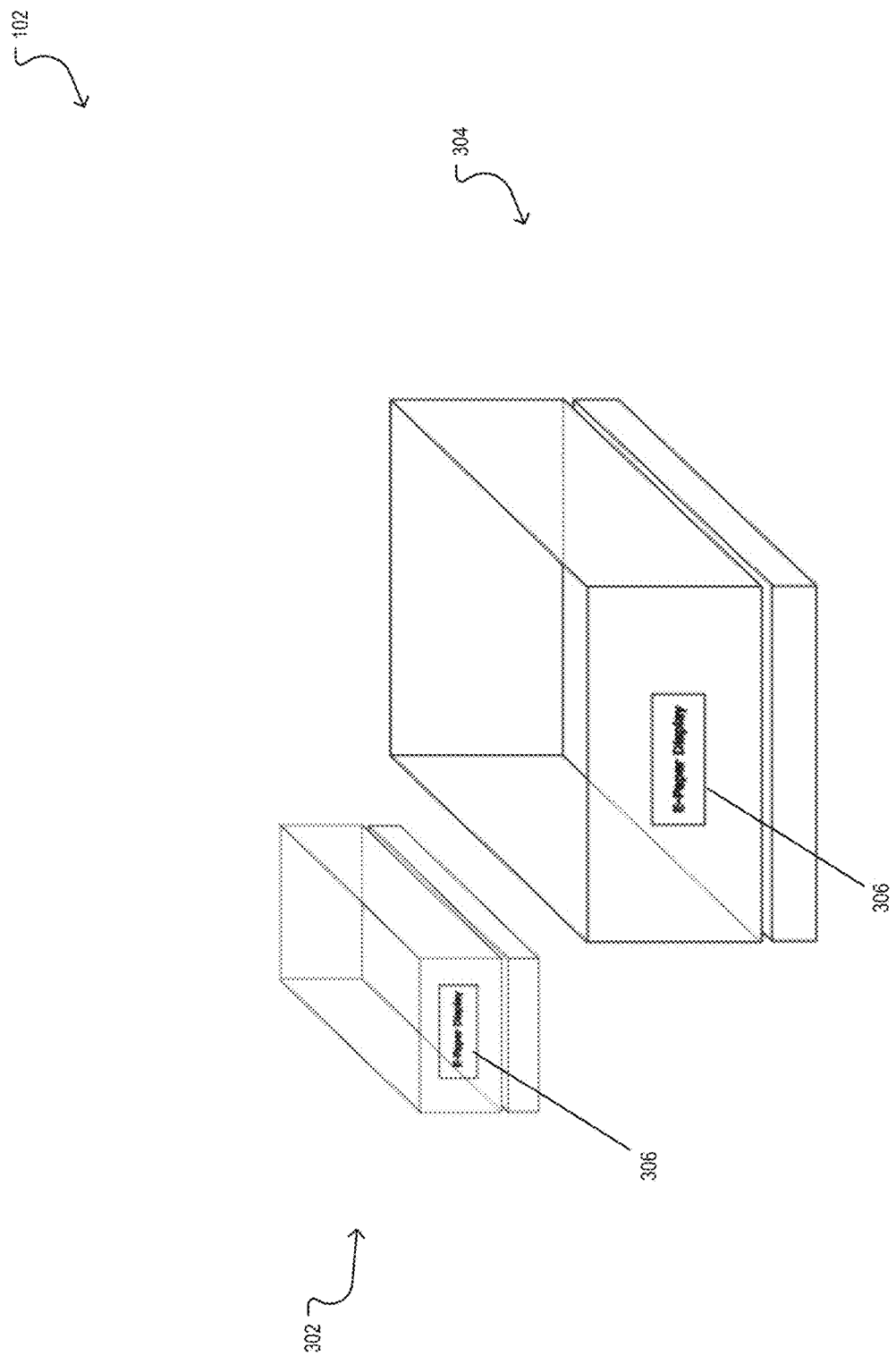
FIG. 3 is another diagram of bins of the automated inventory tracking system according to an example of the instant disclosure.

FIG. 3 is another diagram of bins 102 of the automated inventory tracking system 100 according to an example of the instant disclosure. As shown in FIG. 3, each bin 102 may have a number of different shapes and sizes. A smaller bin 302 may be used for smaller vials of consumables that may have milligram precision and a larger bin or container 304 may have larger items associated with gram precision. A larger container may be fitted with an industrial scale for kilogram or larger quantities. In each of the examples, the bin 102 may be configured to operate as a consumable counter that may count a number of HF or UHF RFID tagged items 110 that may be stored in the bin 102. In addition, each bin may have one or more display devices 306 that may be located on an exterior wall such as an e-paper display.

Figure 4:
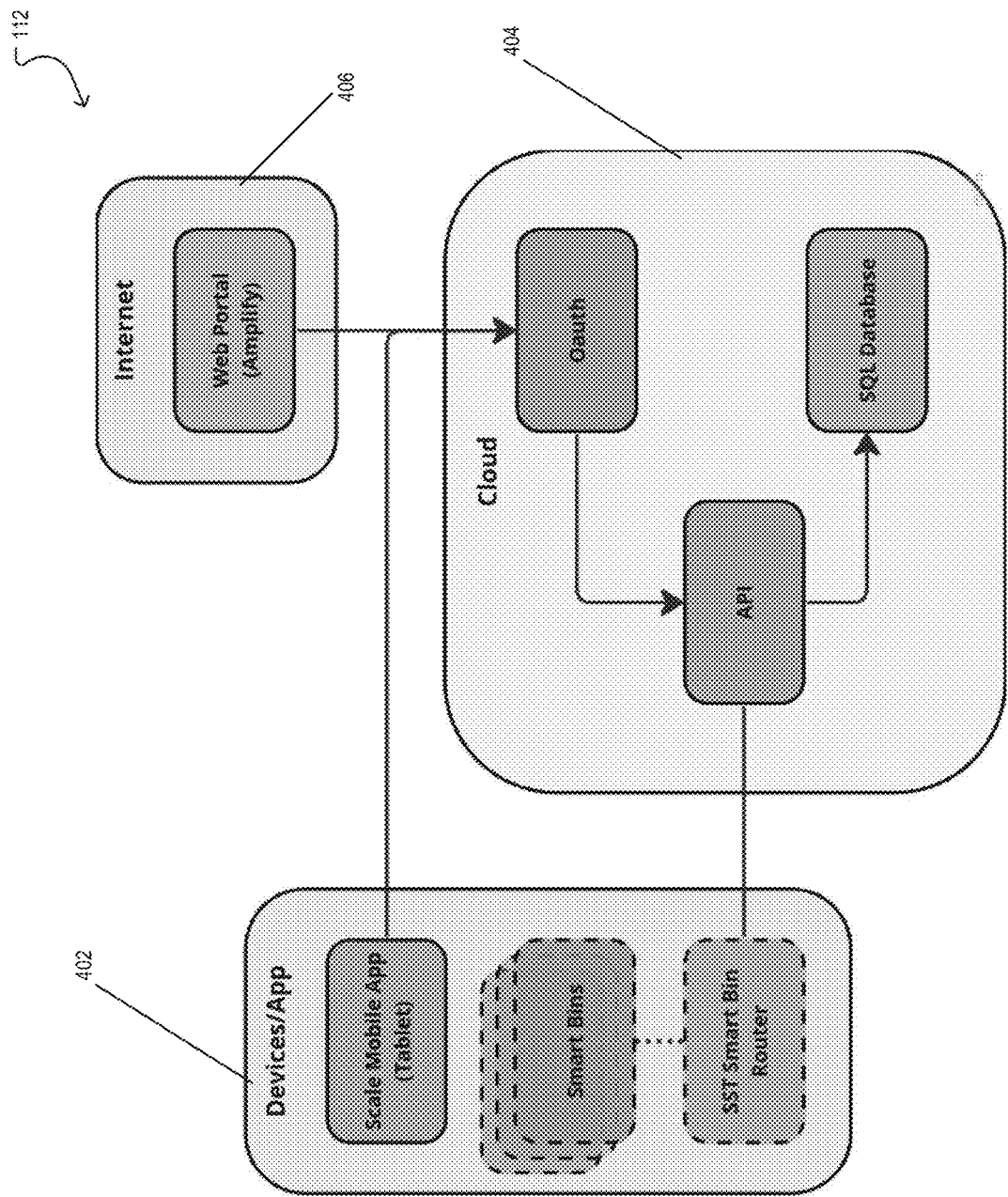
FIG. 4 is a block diagram of an automated inventory tracking application according to an example of the instant disclosure.

FIG. 4 is a block diagram of the automated inventory tracking application 112 according to an example of the instant disclosure. As shown in FIG. 4, the automated inventory tracking application 112 may have a number of components including a client application component 402 and a server application component that may include a cloud component 404 and an Internet or web portal 406. The client application component 402 may be associated with the client computing device 106 and may be a mobile application executed by the client computing device 106. The client computing device 106 may obtain information associated with the one or more bins 102 and may transmit the information associated with the one or more bins 102 to the server computing device 104 for storage in the database 114.

As an example, the client computing device 106 may send the information using one or more APIs and a user may be given access to the one or more APIs using OAuth. The automated inventory tracking application 112 may have a cloud component 404 that may include user and laboratory management that uses authentication and authorization services to grant API permissions to data sources in the database 114. The cloud component 404 may allow the APIs to interact with the automated inventory tracking application 112 and the one or more bins 102 having Internet of Things (IoT) enabled devices can programmatically update inventory records in the database 114. Each of the bins 102 can dispatch events, statuses, consumable HF or UHF RFID identifier information, and consumable weight information using the APIs. In one example, one or more bins 102 may communicate with a smart bin router that may transmit information to the cloud component using the communications network 108. Additionally, the automated inventory tracking application 112 may include a portal 406 that may be a web portal to view real-time information associated with the automated inventory tracking application 112.

As an example, the client computing device 106 may communicate with the server computing device 104 and may have access using Oauth. Oauth is a protocol for authorization and allows a third-party application to obtain limited access to a Hypertext Transfer Protocol (HTTP) service on behalf of a resource owner by allowing an approval interaction between the resource owner and the HTTP service or by allowing the third-party application to have access on its own. As an example, Oauth allows a user to grant a third-party website or web service access to another website or web service without providing a password. As an example, the user may provide their username or handle and Oauth may grant access. As a result, the application 112 may permit a user to share information about their account with a third party application or website. The automated inventory tracking system 100 may use Oauth or another protocol for authorization to allow access to other associated applications and/or accounts.

Figure 5:
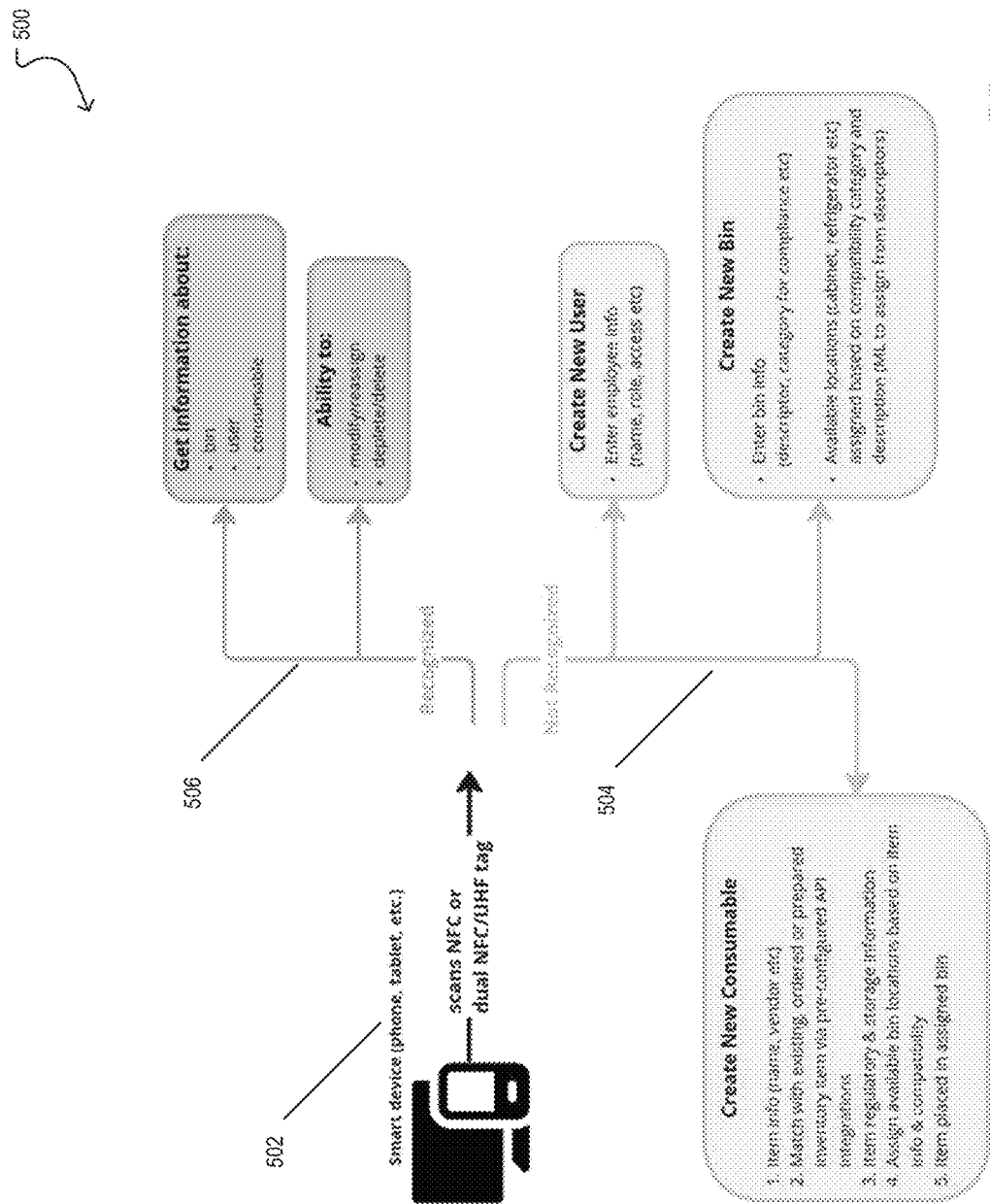
FIG. 5 is a flowchart of a method of scanning a tag according to an example of the instant disclosure.

FIG. 5 is another flowchart of a method 500 of using the client application component of the automated inventory tracking application 112 according to an example of the instant disclosure. As shown in FIG. 5, a user may scan an NFC or a dual NFC/UHF tag that may be associated with an item, consumable, or user 502.

As an example, the tag may be not recognized or unknown 504. In this case, if a user is a new user, they can create a new user account to use the automated inventory tracking system 100 and automated inventory tracking application 112. The user may provide user information such as a name, a role, and access information, among other information. In addition, the user can create a new bin if the tag is associated with a bin. The user may provide bin information such as a descriptor or a description of the bin. In addition, the user may provide information associated with a bin category. The user also may provide location information associated with the bin such as cabinet, refrigerator, or another location. If the tag is associated with an item or a consumable 110, the user may provide new consumable information. As an example, the user may provide item information such as a name of the item, a vendor of the item, and other information. The item or consumable may be matched with an existing, ordered, or prepared inventory item. In one example, the automated inventory tracking application 112 may receive information associated with the existing, ordered, or prepared inventory items using the APIs. The item may be assigned regulatory and storage information. The item may be assigned to an available bin location based on item information and compatibility. In addition, the item may be placed in an assigned bin.

In another example, the tag may be recognized or known 506. The user may view information associated with a bin, a user, or consumable. The user may be able to modify/reassign the bin, user, or consumable. In addition, the user may be able to indicate that the consumable is depleted and may delete the bin, user, or consumable from the system. Authorization to modify or delete users, bins, or consumables from the system may be defined by user roles.

Figure 6:
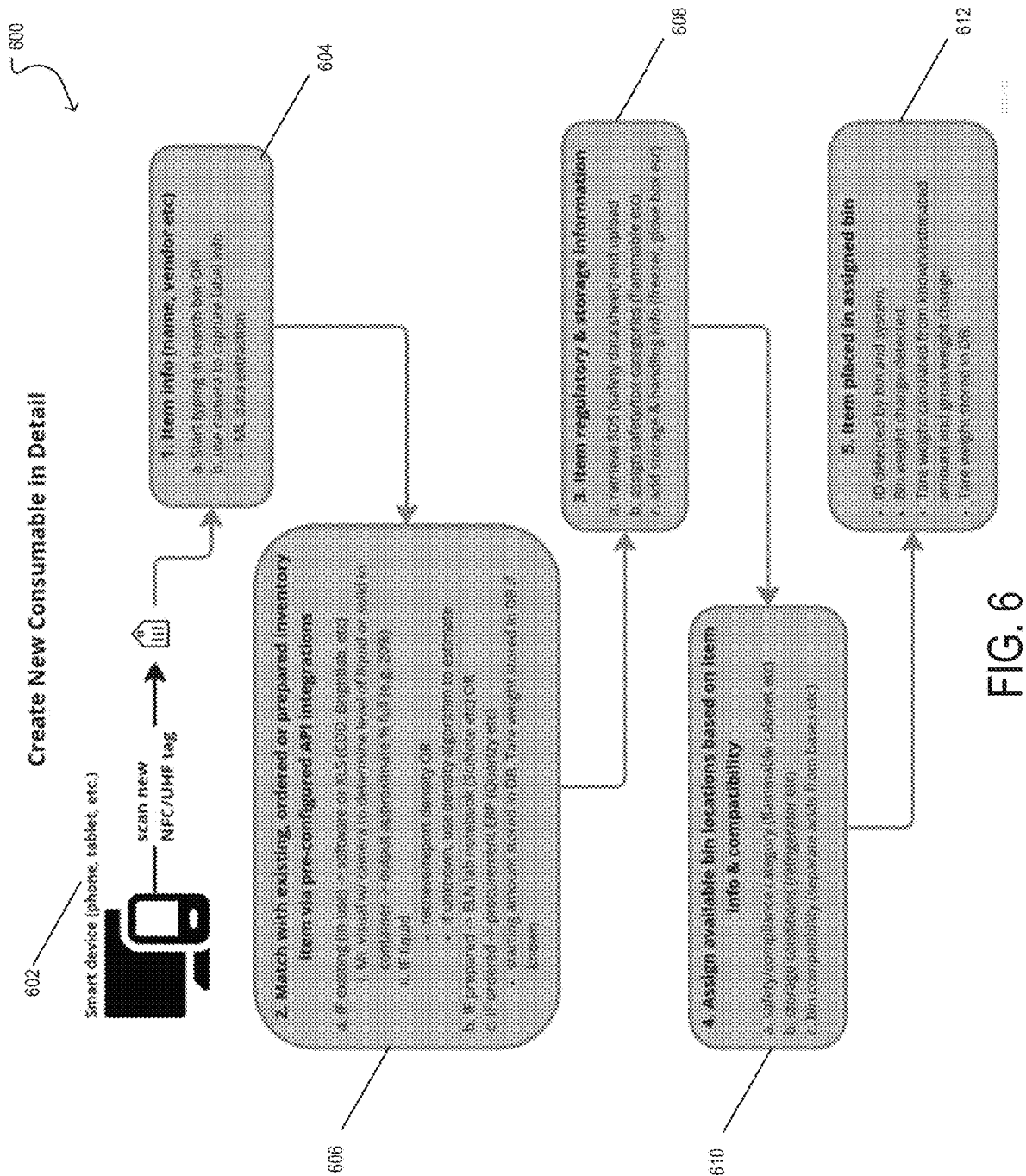
FIG. 6 is a flowchart of a method of creating a new consumable of the automated inventory tracking system according to an example of the instant disclosure.

FIG. 6 is another flowchart of a method of creating a new consumable 600 according to an example of the instant disclosure. As shown in FIG. 6, a user may scan a tag that may be a new NFC/UHF tag in 602. First, in 604, the user may provide item information including name information and vendor information. The user also may use the client computing device 106 to obtain one or more images of the item. The user may search for the item by providing search information and the user may use the one or more images to obtain label information. The client computing device 106 and/or the server computing device 104 may perform image processing to capture and interpret the data from the label that may be based on machine learning.

Next, in 606, the user may match the item with an existing, ordered, or prepared inventory item. As an example, if the item is an existing or in-use item, the automated inventory tracking application 112 may use the one or more images to determine a level of liquid or solid in the container. If the item is a liquid, the automated inventory tracking application 112 may retrieve or report a density or may determine a density by estimating the density based on the information known about the item. If the item is prepared, information may be obtained from a laboratory notebook software application or system. If the item is ordered, information may be obtained from a procurement enterprise resource planning (ERP) system. A starting amount of the item may be stored in the database 114. In addition, a tare weight may be stored in the database 114 if known.

Next, in 608, item regulatory and storage information may be obtained. An associated safety data sheet (SDS) may be obtained and uploaded to the server computing device 104. The item may be assigned to safety and toxicity categories. In addition, storage and handling information may be determined. As an example, the item may have to be stored in a freezer or a glove box.

Next, in 610, the item may be assigned to available bin locations based on item information and compatibility. The item may be placed into a particular safety/compliance category and may be stored in a flammable cabinet, e.g., a cabinet having items that may be flammable. The item may have particular storage conditions and may have to be stored in a refrigerator. In addition, the item may have particular bin compatibility. Acids may have to be separated from bases. Next, in 612, the item may be placed in an assigned bin. An identifier may be detected by the bin 102 and by the automated inventory tracking system 100. A bin weight change may be detected. A tare weight may be determined from known/estimated amount and a gross weight change that may be determined. The tare weight may be stored in the database 114.

In one example, if a user places a particular item into a bin 102 that has items that are not compatible with the particular item, the bin may detect that the particular item is in an incorrect location. The bin may send information associated with the particular item to the server computing device 104 and the server computing device 104 may send an alert to one or more users that may be notified. The server computing device 104 may also send an alert back to the bin microprocessor and display the alert through the bin user interface. The alert may be provided digitally through the e-paper tag display on the bin or it may be an audio or visual alert from the bin smart device. In this example, the bin 102 may provide an alert that may be provided by one or more light emitting diodes (LEDs) and/or one or more sound producing devices that may be located on or associated with the bin. In response to the one or more alerts, the one or more users may then take action to move the particular item to a correct location.

In another example, if a user places a particular item into a bin 102 that belongs in the bin, the bin may send information associated with the particular item to the server computing 104 device and the server computing device 104 may send an alert to one or more users that may be notified. In another example, the bin 102 may provide some sort of alert that may be provided by one or more light emitting diodes (LEDs) and/or one or more sound producing devices that may be located on or associated with the bin.

Figure 7:
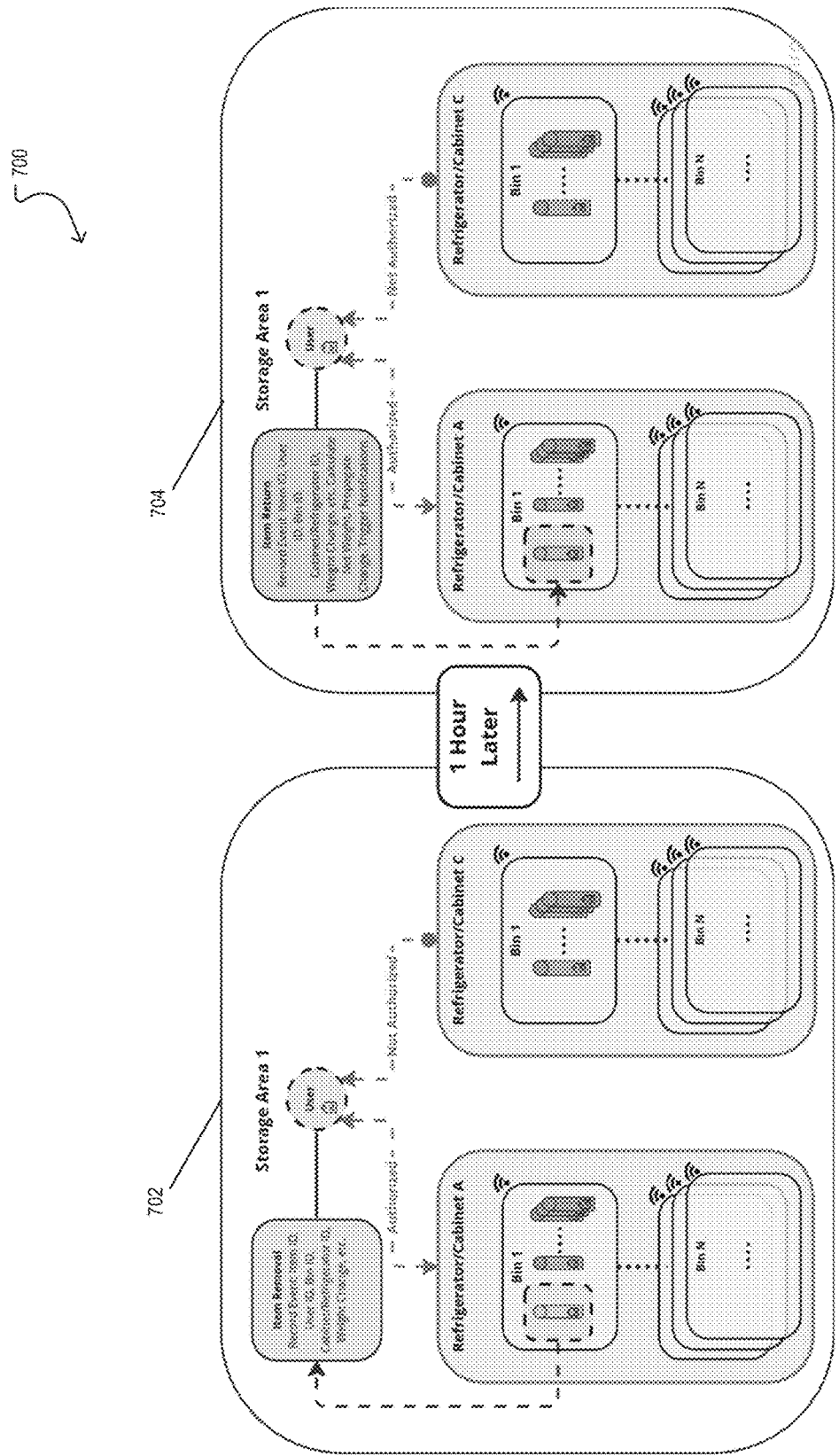
FIG. 7 is a flowchart of a method of item removal and item return according to an example of the instant disclosure.

FIG. 7 is another flowchart of a method 700 of removing an item or consumable 110 from a bin 102 at a first time and returning the item or consumable 110 to the bin 102 at a second time later than the first time according to an example of the instant disclosure. As shown in FIG. 7, in 702, an item 110 may be removed from a first storage area. The user may not be authorized to access items, such as items that are dangerous or Drug Enforcement Agency controlled, in a particular refrigerator or cabinet such as refrigerator/cabinet C. In one example, some users may be granted access to some storage areas but not others due to security reasons or other reasons. However, the user may be authorized to access items in refrigerator/cabinet A. The user may remove an item and this event may be recorded and stored. The event may have an associated item identifier, an associated user identifier, an associated bin identifier, a cabinet/refrigerator identifier, and a weight change. The event may be stored in the database 114.

One hour later, in 704, the item may be returned. A new event may occur. The event may have an associated item identifier, a user identifier, a bin identifier, a cabinet/refrigerator identifier, and a weight change. A net weight may be determined. Notifications may be sent by the automated inventory tracking application 112.

Figure 8:
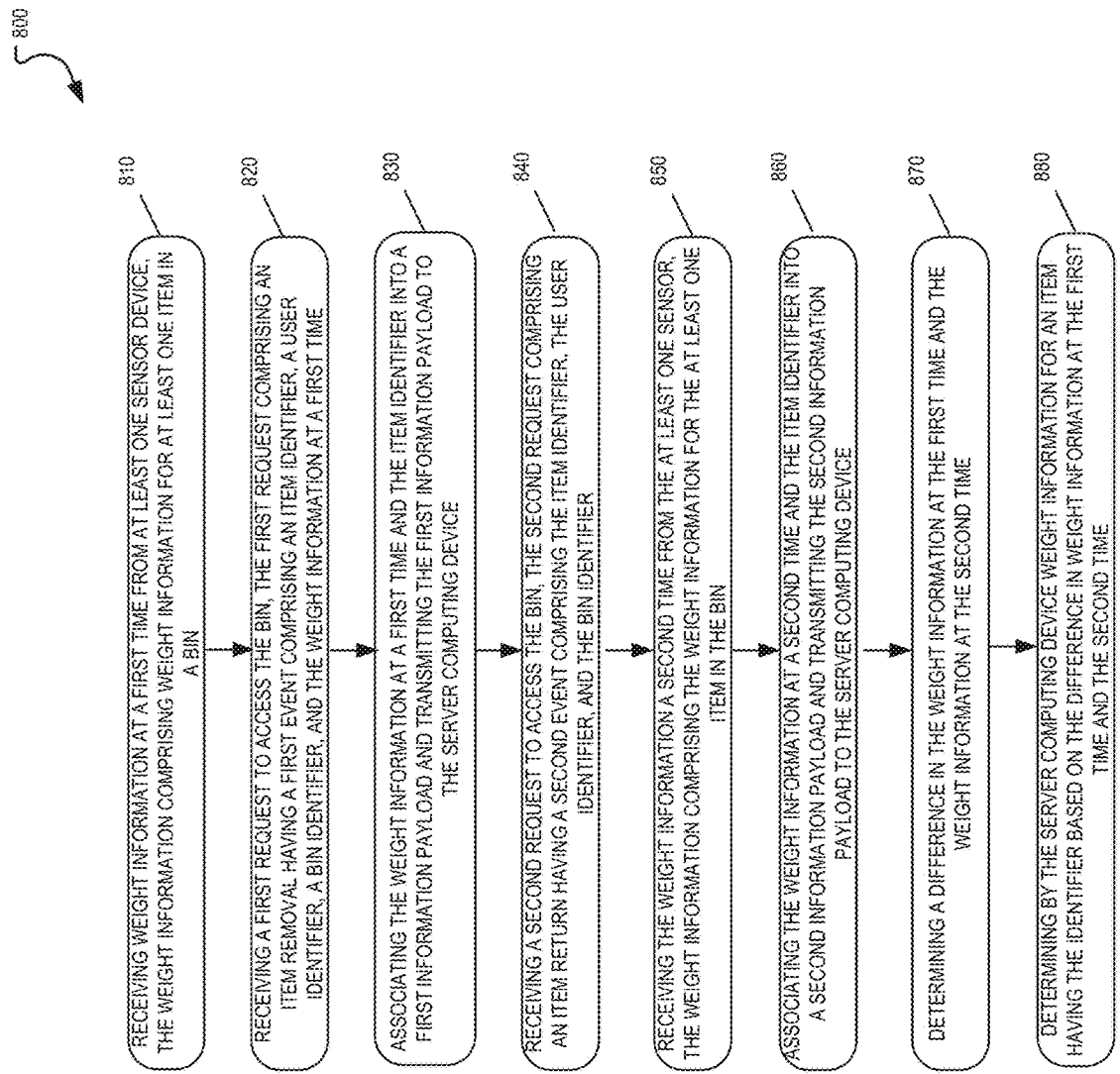
FIG. 8 is a flowchart of a method of determining a difference in weight of an item according to an example of the instant disclosure.

FIG. 8 illustrates an example method 800 of determining a difference in weight of an item according to an example of the instant disclosure. Although the example method 800 depicts a particular sequence of operations, the sequence may be altered without departing from the scope of the present disclosure. For example, some of the operations depicted may be performed in parallel or in a different sequence that does not materially affect the function of the method 800. In other examples, different components of an example device or system that implements the method 800 may perform functions at substantially the same time or in a specific sequence.

According to some examples, the method 800 may include receiving and transmitting to a server computing device 104, by at least one processor, weight information at a first time from at least one sensor device, the weight information comprising weight information for at least one item 110 in a bin 102 at block 810.

Next, according to some examples, the method 800 may include receiving, by a bin detector, a first request to access the bin 102, the first request comprising an item removal having a first event comprising an item identifier, a user identifier, a bin identifier, and the weight information at a first time at block 820.

Next, according to some examples, the method 800 may include associating the first weight and item identifier into a first information payload and transmitting, by the bin detector, of the first information payload to the server computing device 104, the server computing device further associating concurrent user information from a storage area detector and updating a status for an item as checked out by a detected user having the user identifier at block 830.

Next, according to some examples, the method 800 may include receiving, by the bin detector, a second request to access the bin 102, the second request comprising an item return having a second event comprising the item identifier, the user identifier, and the bin identifier at block 840.

Next, according to some examples, the method 800 may include receiving, by the at least one processor, the weight information a second time from the at least one sensor device, the weight information comprising the weight information for the at least one item in the bin at block 850.

Next, according to some examples, the method 800 may include associating the second weight and item identifier into a second information payload and transmitting, by the bin detector, the second information payload to the server computing device 104, the server computing device further associating concurrent user information from the storage area detector at block 860.

Next, according to some examples, the method 800 may include determining, by the server computing device 104, a difference in the weight information at the first time and the weight information at the second time at block 870.

Next, according to some examples, the method 800 may include determining, by the server computing device 104, weight information for an item 110 having the item identifier based on the difference in the weight information at the first time and the weight information at the second time then storing the updated weight information in a database and updating the status, amount, and bin location of the returned item in an automated inventory application at block 880.

In some examples, the method 800 may include sending, by a computing device such as the server computing device 104, an alert based on the weight information for the item having the item identifier. In other examples, the method 800 may include sending an alert based on at least one of an expiration date of an item having the item identifier, a low level of the item having the item identifier, disposal information for the item having the item identifier, and automated reordering information for the item having the item identifier.

In some examples, the method 800 may include recognizing and sending, by the server computing device 104, an alert or purchase order request based on the weight information for the item having the item identifier, or recognizing an incompatible storage, quality concern, or an incorrect storage location and sending, by the server computing device, one or more alerts to a user, or one or more alerts to the bin to alert a user via visual or audio alerts.

In some examples, the method 800 may include determining the weight information for the item having the item identifier by performing image processing of at least one image of the item to determine a level of solid, liquid, or semi-solid substance remaining within a container and computing an estimated substance weight by applying an estimated percentage full from image processing to an initial purchase quantity from a container label.

In some examples, the method 800 may include determining the bin identifier based on a tag assigned to the bin and determining the user identifier based on a tag assigned to the user.

As an example, the at least one detector may be at least one cabinet detector to determine the bin identifier and determine the user identifier and at least one bin detector to determine the item identifier.

In some examples, the method 800 may include determining the item identifier based on a tag assigned to the item.

As an example, the tag may be a radio frequency identification (RFID) tag. The RFID tag may be either a HF tag, e.g., an NFC tag, and/or an UHF tag.

In some examples, the method 800 may include determining the bin identifier based on a tag assigned to the bin.

As another example, the method 800 may include determining the user identifier based on a tag assigned to the user.

As another example, the method 800 may include scanning, by a computing device, a tag, and assigning a unique identifier associated with the tag to one of a user, a bin, and an item, and transmitting, by the computing device, the unique identifier to a server computing device 104.

As another example, the method 800 may include obtaining, by at least one imaging device, a label of the item and performing, by the computing device, image processing to determine a name, chemical identifier number, product number, supplier, or other information about the item including an initial amount of a purchased item.

As another example, the method 800 may include displaying information about the bin on an e-paper display of the bin 102.

Figure 9:
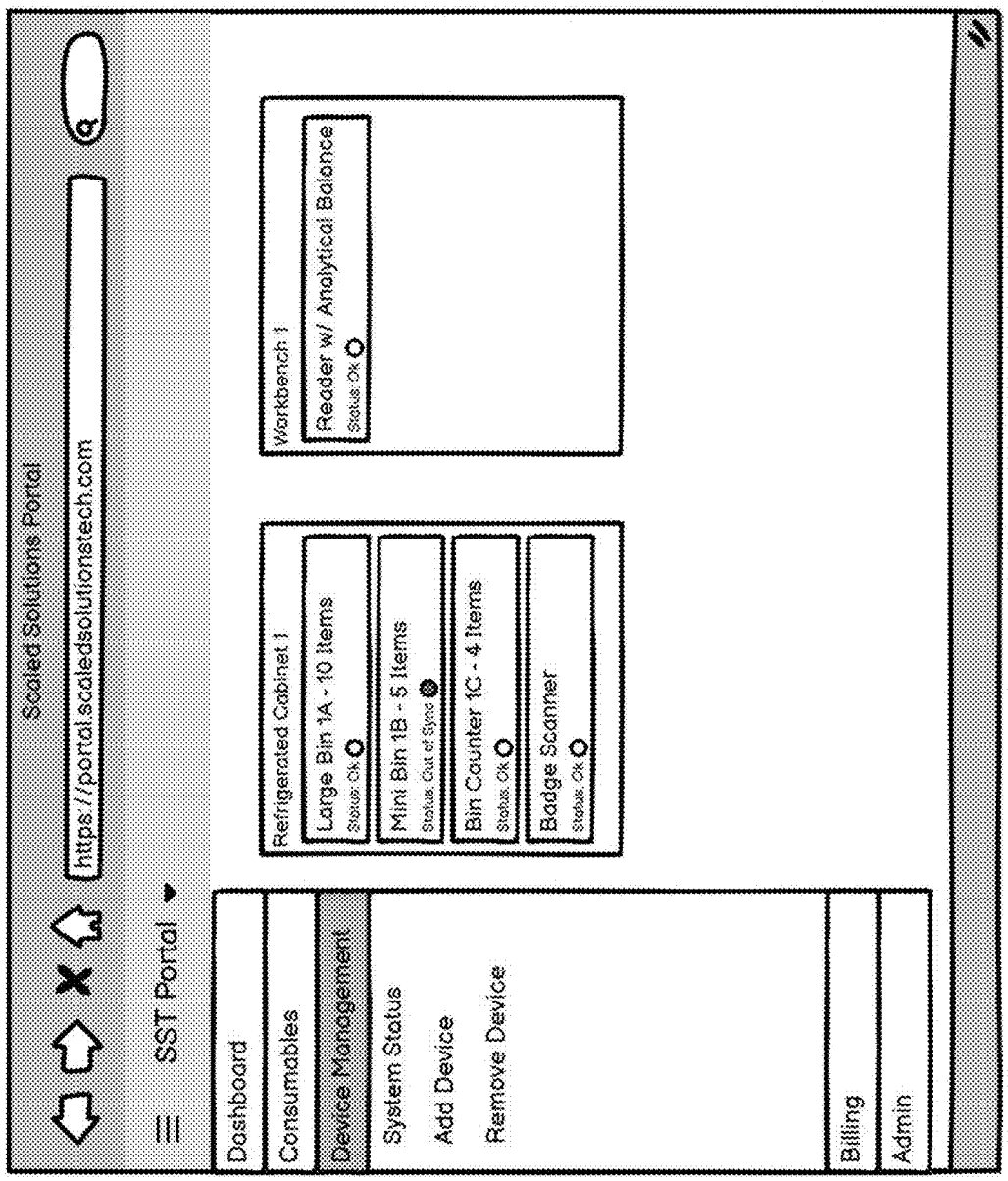
FIG. 9 shows a graphical user interface of an automated inventory tracking application associated with the system according to an example of the instant disclosure.

FIG. 9 shows a graphical user interface (GUI) 900 of the automated inventory tracking application 112 associated with the system according to an example of the instant disclosure. As shown in FIG. 9, the GUI 900 may include a portal. The portal may allow users to manage inventory of consumables as well as manage devices associated with the automated inventory tracking system 100. The devices may include the one or more bins 102, computing devices, and analytical lab balances and scales. The portal may provide a conceptual layout of laboratory storage by defining cabinets, workbenches, glove boxes, refrigerator units, and other storage spaces that may be in a laboratory. Each defined storage space may be assigned one or more devices that may be used to organize and locate consumables. A device may broadcast status information to the automated inventory tracking application 112 including battery life, connectivity information, consumable tracking information, device firmware information, and other information.

Figure 10:
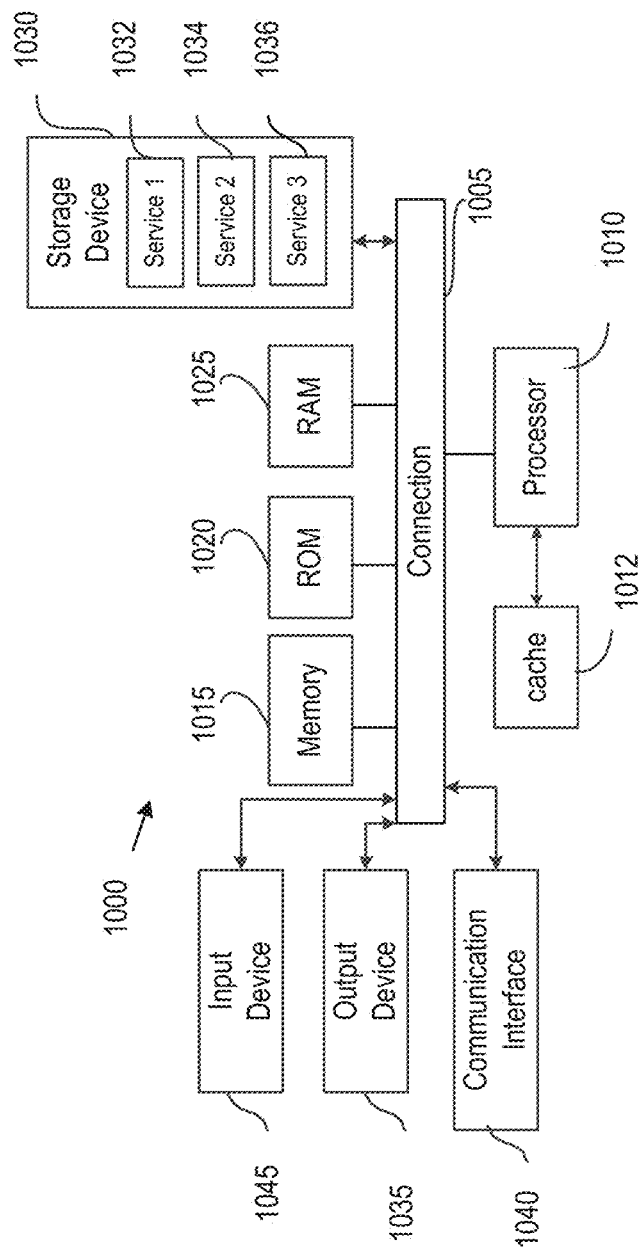
FIG. 10 shows an example of a system for implementing certain aspects of the present technology.

FIG. 10 shows an example of computing system 1000, which can be for example any computing device making up the computing device such as the client computing device 106, the server computing device 104, or any component thereof in which the components of the system are in communication with each other using connection 1005. Connection 1005 can be a physical connection via a bus, or a direct connection into processor 1010, such as in a chipset architecture. Connection 1005 can also be a virtual connection, networked connection, or logical connection.

In some embodiments, computing system 1000 is a distributed system in which the functions described in this disclosure can be distributed within a datacenter, multiple data centers, a peer network, etc. In some embodiments, one or more of the described system components represents many such components each performing some or all of the function for which the component is described. In some embodiments, the components can be physical or virtual devices.

Example system 1000 includes at least one processing unit (CPU or processor) 1010 and connection 1005 that couples various system components including system memory 1015, such as read-only memory (ROM) 1020 and random access memory (RAM) 1025 to processor 1010. Computing system 1000 can include a cache of high-speed memory 1012 connected directly with, in close proximity to, or integrated as part of processor 1010.

Processor 1010 can include any general purpose processor and a hardware service or software service, such as services 1032, 1034, and 1036 stored in storage device 1030, configured to control processor 1010 as well as a special-purpose processor where software instructions are incorporated into the actual processor design. Processor 1010 may essentially be a completely self-contained computing system, containing multiple cores or processors, a bus, memory controller, cache, etc. A multi-core processor may be symmetric or asymmetric.

To enable user interaction, computing system 1000 includes an input device 1045, which can represent any number of input mechanisms, such as a microphone for speech, a touch-sensitive screen for gesture or graphical input, keyboard, mouse, motion input, speech, etc. Computing system 1000 can also include output device 1035, which can be one or more of a number of output mechanisms known to those of skill in the art. In some instances, multimodal systems can enable a user to provide multiple types of input/output to communicate with computing system 1000. Computing system 1000 can include communications interface 1040, which can generally govern and manage the user input and system output. There is no restriction on operating on any particular hardware arrangement, and therefore the basic features here may easily be substituted for improved hardware or firmware arrangements as they are developed.

Storage device 1030 can be a non-volatile memory device and can be a hard disk or other types of computer readable media which can store data that are accessible by a computer, such as magnetic cassettes, flash memory cards, solid state memory devices, digital versatile disks, cartridges, random access memories (RAMs), read-only memory (ROM), and/or some combination of these devices.

The storage device 1030 can include software services, servers, services, etc., that when the code that defines such software is executed by the processor 1010, it causes the system to perform a function. In some embodiments, a hardware service that performs a particular function can include the software component stored in a computer-readable medium in connection with the necessary hardware components, such as processor 1010, connection 1005, output device 1035, etc., to carry out the function.

For clarity of explanation, in some instances, the present technology may be presented as including individual functional blocks including functional blocks comprising devices, device components, steps or routines in a method embodied in software, or combinations of hardware and software.

Any of the steps, operations, functions, or processes described herein may be performed or implemented by a combination of hardware and software services or services, alone or in combination with other devices. In some embodiments, a service can be software that resides in memory of a client device and/or one or more servers of a content management system and perform one or more functions when a processor executes the software associated with the service. In some embodiments, a service is a program or a collection of programs that carry out a specific function. In some embodiments, a service can be considered a server. The memory can be a non-transitory computer-readable medium.

In some embodiments, the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer-readable media. Such instructions can comprise, for example, instructions and data which cause or otherwise configure a general purpose computer, special purpose computer, or special purpose processing device to perform a certain function or group of functions. Portions of computer resources used can be accessible over a network. The executable computer instructions may be, for example, binaries, intermediate format instructions such as assembly language, firmware, or source code. Examples of computer-readable media that may be used to store instructions, information used, and/or information created during methods according to described examples include magnetic or optical disks, solid-state memory devices, flash memory, USB devices provided with non-volatile memory, networked storage devices, and so on.

Devices implementing methods according to these disclosures can comprise hardware, firmware and/or software, and can take any of a variety of form factors. Typical examples of such form factors include servers, laptops, smartphones, small form factor personal computers, personal digital assistants, and so on. The functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Illustrative examples of the disclosure include:

Aspect 1: A system comprising: a bin detector comprising an antenna, a bin configured to accommodate at least one item and having a bin unique identifier, at least one processor to receive a weight of the at least one item from at least one sensor in communication with a scale, and at least one battery to power the system, the bin detector to transmit a first signal, receive a second signal in response to the first signal for each of the at least one item and determine an item unique identifier for each of the at least one item, and transmit the bin unique identifier, the item unique identifier for each of the at least one item, and the weight information to the at least one processor to transmit the bin unique identifier, the item unique identifier for each of the at least one item, and the weight information to a server computing device using a communication network.

Aspect 2: The system of Aspect 1, further comprising at least one display device to display information associated with the bin and electromagnetic field (EMF) shielding to prevent electromagnetic noise.

Aspect 3: The system of Aspects 1 and 2, wherein the display device comprises an e-paper display.

Aspect 4: The system of Aspects 1 to 3, wherein the bin comprises a first detachable storage area covered in walled EMF shielding to accommodate the at least one item and a second component housing to house the at least one processor, the at least one sensor, the at least one battery, and the antenna.

Aspect 5: The system of Aspects 1 to 4, wherein the second component housing receives the first detachable storage area on a top of the second component housing.

Aspect 6: The system of Aspects 1 to 5, wherein the weight comprises a first weight and the antenna determines removal of an item having a tag with a particular item unique identifier.

Aspect 7: The system of Aspects 1 to 6, wherein the antenna determines return of the item having the tag with the particular item unique identifier, a second weight is determined by the at least one sensor, and a change in weight for the item having the tag with the particular item unique identifier is determined based on a difference between the first weight and the second weight.

Aspect 8: The system of Aspects 1 to 7, wherein the antenna receives a response from a radio frequency (RFID) tag on each item in the bin to determine the item unique identifier for each item.

Aspect 9: The system of Aspects 1 to 8, wherein the bin unique identifier, the item unique identifier for each of the at least one item, and the weight information are sent as a payload to the server computing device.

Aspect 10: A method comprising receiving and transmitting, by at least one processor, to a server computing device, weight information at a first time from at least one sensor device, the weight information comprising weight information for at least one item in a bin, receiving, by a bin detector, a first request to access the bin, the first request comprising an item removal having a first event comprising an item identifier, a user identifier, a bin identifier, and the weight information at the first time, associating, by the at least one processor, the first weight and the item identifier into a first information payload and transmitting, by the bin detector, of the first information payload to the server computing device, the server computing device further associating concurrent user information from a storage area detector and updating a status for an item as checked out by a detected user having the user identifier, receiving, by the bin detector, a second request to access the bin, the second request comprising an item return having a second event comprising the item identifier, the user identifier, and the bin identifier, receiving, by the at least one processor, the weight information a second time from the at least one sensor device, the weight information comprising the weight information for the at least one item in the bin, associating, by the at least one processor, the second weight and the item identifier into a second information payload and transmitting, by the bin detector, the second information payload to the server computing device, the server computing device further associating concurrent user information from the storage area detector, determining, by the server computing device, a difference in the weight information at the first time and the weight information at the second time, and determining, by the server computing device, weight information for an item having the item identifier based on the difference in the weight information at the first time and the weight information at the second time and storing updated weight information in a database and updating a status, amount, and bin location of the item in an automated inventory application.

Aspect 11: The method of Aspect 10, further comprising recognizing and sending, by the server computing device, an alert or purchase order request based on the weight information for the item having the item identifier, or recognizing an incompatible storage, quality concern, or an incorrect storage location and sending, by the server computing device, one or more alerts to a user, or one or more alerts to the bin to alert a user via visual or audio alerts.

Aspect 12: The method of Aspects 10 and 11, further comprising determining the item identifier based on a tag assigned to the item.

Aspect 13: The method of Aspects 10 to 12, wherein the tag comprises a radio frequency identification (RFID) tag.

Aspect 14: The method of Aspects 10 to 13, wherein the tag comprises at least one of a high frequency RFID tag and an ultra-high frequency tag.

Aspect 15: The method of Aspects 10 to 14, further comprising determining the weight information for the item having the item identifier by performing image processing of at least one image of the item to determine a level of solid, liquid, or semi-solid substance remaining within a container and computing an estimated substance weight by applying an estimated percentage full from image processing to an initial purchase quantity from a container label.

Aspect 16: The method of Aspects 10 to 15, further comprising determining the bin identifier based on a tag assigned to the bin and determining the user identifier based on a tag assigned to the user.

Aspect 17: The method of Aspects 10 to 16, further comprising displaying information about the bin on an e-paper display of the bin.

Aspect 18: The method of Aspects 10 to 17, further comprising scanning, by a computing device, a tag, and assigning a unique identifier associated with the tag to one of a user, a bin, and an item, and transmitting, by the computing device, the unique identifier to the server computing device.

Aspect 19: The method of Aspects 10 to 18, further comprising obtaining, by at least one imaging device, a label of the item and performing, by the computing device, image processing to determine a name, chemical identifier number, product number, and supplier about the item including an initial amount of a purchased item.

Aspect 20: A storage container comprising a first removable component comprising: a bin configured to accommodate at least one item and having a bin unique identifier and electromagnetic field (EMF) shielding to prevent electromagnetic noise, and a second component housed underneath the first removable component comprising: a bin detector comprising an antenna, at least one processor to receive a weight of the at least one item from at least one sensor in communication with a scale, and at least one battery to power the storage container, the bin detector to transmit a first signal, receive a second signal in response to the first signal for each of the at least one item and determine an item unique identifier for each of the at least one item, and transmit the bin unique identifier, the item unique identifier for each of the at least one item, and the weight information to the at least one processor to transmit the bin unique identifier, the item unique identifier for each of the at least one item, and the weight information to a server computing device using a communication network.

What is claimed is:

1. A system comprising:
   a bin detector comprising an antenna;
   a bin configured to accommodate at least one item and having a bin unique identifier;
   at least one processor to receive a first weight of each of the at least one item from at least one sensor in communication with a scale at a first time and receive a second weight of each of the at least one item from the at least one sensor in communication with the scale, and determine a difference between the first weight and the second weight comprising weight information of each of the at least one item; and
   at least one battery to power the system,
   the bin detector to transmit a first signal, receive a second signal in response to the first signal for each of the at least one item and determine an item unique identifier for each of the at least one item, and transmit the bin unique identifier, the item unique identifier for each of the at least one item, and the weight information for each of the at least one item to the at least one processor to transmit the bin unique identifier, the item unique identifier for each of the at least one item, and the weight information for each of the at least one item to a server computing device using a communication network.

2. The system of claim 1, further comprising at least one display device to display information associated with the bin and electromagnetic field (EMF) shielding to prevent electromagnetic noise.

3. The system of claim 2, wherein the display device comprises an e-paper display.

4. The system of claim 1, wherein the bin comprises a first detachable storage area covered in walled EMF shielding to accommodate the at least one item and a second component housing to house the at least one processor, the at least one sensor, the at least one battery, and the antenna.

5. The system of claim 4, wherein the second component housing receives the first detachable storage area on a top of the second component housing.

6. The system of claim 1, wherein the antenna determines removal of an item having a tag with a particular item unique identifier.

7. The system of claim 6, wherein the antenna determines return of the item having the tag with the particular item unique identifier, and the second weight is determined by the at least one sensor.

8. The system of claim 1, wherein the antenna receives a response from a radio frequency (RFID) tag on each item in the bin to determine the item unique identifier for each item.

9. The system of claim 1, wherein the bin unique identifier, the item unique identifier for each of the at least one item, and the weight information are sent as a payload to the server computing device.

10. A method, comprising:
receiving and transmitting, by at least one processor, to a server computing device, a first weight of each of at least one item in a bin comprising weight information at a first time from at least one sensor device;
receiving, by a bin detector, a first request to access the bin, the first request comprising an item removal having a first event comprising an item identifier of each of the at least one item, a user identifier, a bin identifier, and the weight information at the first time;
associating, by the at least one processor, the first weight and the item identifier for each of the at least one item into a first information payload and transmitting, by the bin detector, the first information payload to the server computing device, the server computing device further associating concurrent user information from a storage area detector and updating a status for each of the at least one item as checked out by a detected user having the user identifier;
receiving, by the bin detector, a second request to access the bin, the second request comprising an item return having a second event comprising the item identifier for each of the at least one item, the user identifier, and the bin identifier;
receiving, by the at least one processor, a second weight of each of the at least one item comprising the weight information a second time from the at least one sensor device;
associating, by the at least one processor, the second weight and the item identifier for each of the at least one item into a second information payload and transmitting, by the bin detector, the second information payload to the server computing device, the server computing device further associating concurrent user information from the storage area detector;
determining, by the server computing device, a difference in the weight information at the first time and the weight information at the second time for each of the at least one item; and determining, by the server computing device, updated weight information for each of the at least one item based on the difference in the weight information at the first time and the weight information at the second time and storing the updated weight information in a database and updating a status, amount, and bin location of each of the at least one item in an automated inventory application.

11. The method of claim 10, further comprising recognizing and sending, by the server computing device, an alert or purchase order request based on the weight information for an item having an item identifier, or recognizing an incompatible storage, quality concern, or an incorrect storage location and sending, by the server computing device, one or more alerts to a user, or one or more alerts to the bin to alert a user via visual or audio alerts.

12. The method of claim 10, further comprising determining an item identifier based on a tag assigned to an item.

13. The method of claim 12, wherein the tag comprises a radio frequency identification (RFID) tag.

14. The method of claim 12, wherein the tag comprises at least one of a high frequency RFID tag and an ultra-high frequency tag.

15. The method of claim 10, further comprising determining the weight information for an item having an item identifier by performing image processing of at least one image of the item to determine a level of solid, liquid, or semi-solid substance remaining within a container and computing an estimated substance weight by applying an estimated percentage full from image processing to an initial purchase quantity from a container label.

16. The method of claim 10, further comprising determining the bin identifier based on a tag assigned to the bin and determining the user identifier based on a tag assigned to the user.

17. The method of claim 10, further comprising displaying information about the bin on an e-paper display of the bin.

18. The method of claim 10, further comprising scanning, by a computing device, a tag, and assigning a unique identifier associated with the tag to one of a user, a bin, and an item, and transmitting, by the computing device, the unique identifier to the server computing device.

19. The method of claim 18, further comprising obtaining, by at least one imaging device, a label of an item and performing, by the computing device, image processing to determine a name, chemical identifier number, product number, and supplier about the item including an initial amount of a purchased item.

20. A storage container comprising:
a first removable component comprising:
a bin configured to accommodate at least one item and having a bin unique identifier; and electromagnetic field (EMF) shielding to prevent electromagnetic noise; and
a second component housed underneath the first removable component comprising:
a bin detector comprising an antenna;
at least one processor to receive a first weight of each of the at least one item from at least one sensor in communication with a scale at a first time and receive a second weight of the at least one item from the at least one sensor in communication with the scale, and determine a difference between the first weight and the second weight comprising weight information of each of the at least one item; and
at least one battery to power the storage container, the bin detector to transmit a first signal, receive a second signal in response to the first signal for each of the at least one item and determine an item unique identifier for each of the at least one item, and transmit the bin unique identifier, the item unique identifier for each of the at least one item, and the weight information for each of the at least one item to the at least one processor to transmit the bin unique identifier, the item unique identifier for each of the at least one item, and the weight information for each of the at least one item to a server computing device using a communication network.

* * * * *